US008840464B1

(12) United States Patent
Brunell et al.

(10) Patent No.: US 8,840,464 B1
(45) Date of Patent: Sep. 23, 2014

(54) COORDINATING MEDIA IN A WAGERING GAME ENVIRONMENT

(75) Inventors: Edward G. Brunell, Chicago, IL (US); Larry J. Pacey, Northbrook, IL (US); Eric M. Pryzby, Skokie, IL (US); Paul J. Radek, Naperville, IL (US)

(73) Assignee: WMS Gaming, Inc., Waukegan, IL (US)

( * ) Notice: Subject to any disclaimer, the term of this patent is extended or adjusted under 35 U.S.C. 154(b) by 36 days.

(21) Appl. No.: 13/094,811

(22) Filed: Apr. 26, 2011

Related U.S. Application Data

(60) Provisional application No. 61/327,871, filed on Apr. 26, 2010, provisional application No. 61/412,304, filed on Nov. 10, 2010.

(51) Int. Cl.
*A63F 9/24* (2006.01)
*A63F 13/00* (2014.01)

(52) U.S. Cl.
USPC .................... 463/29; 463/25; 463/30; 463/42

(58) Field of Classification Search
USPC ................................... 463/20, 25, 30, 40, 29
See application file for complete search history.

(56) References Cited

U.S. PATENT DOCUMENTS 5,483,631 A 1/1996 Nagai et al.
5,633,933 A 5/1997 Aziz
6,040,831 A 3/2000 Nishida
6,081,266 A 6/2000 Sciammaella
6,146,273 A 11/2000 Olsen
6,217,448 B1 4/2001 Olsen
6,647,119 B1 11/2003 Slezak
6,843,723 B2 1/2005 Joshi
6,939,226 B1 9/2005 Joshi et al.
6,960,136 B2 11/2005 Joshi et al.
6,972,528 B2 12/2005 Shao (Continued)

FOREIGN PATENT DOCUMENTS

EP 1439507 7/2004
WO WO-2004086320 10/2001

(Continued)

OTHER PUBLICATIONS

Wikipedia, DMX512-A, May 23, 2008, http://en.wikipedia.org/wiki/DMX512.*

(Continued)

*Primary Examiner* — Dmitry Suhol
*Assistant Examiner* — Jason Yen
(74) *Attorney, Agent, or Firm* — DeLizio Gilliam, PLLC

(57) ABSTRACT

In some embodiments, a wagering game machine includes an interface configured to receive media information from an emotive lighting controller remote from the wagering game machine, wherein the media information indicates settings for media devices remote from the wagering game machine. The wagering game machine can also include an operating system configured to detect receipt of the media information over the interface, and to deliver the media information to a wagering game unit. The wagering game machine can also include the wagering game unit configured to receive the media information from the operating system, and select, based on the media information, one or more colors for graphical game elements of a wagering game. The wagering game unit can also present the wagering game including the graphical game elements, wherein the graphical game elements are colored according to the one or more colors.

20 Claims, 7 Drawing Sheets

(56) References Cited

U.S. PATENT DOCUMENTS

| | | | | |
|---|---|---|---|---|
| 6,974,385 | B2 | 12/2005 | Joshi et al. | |
| 6,991,543 | B2 | 1/2006 | Joshi | |
| 6,997,803 | B2 | 2/2006 | LeMay et al. | |
| 7,082,572 | B2 | 7/2006 | Pea et al. | |
| 7,112,139 | B2 | 9/2006 | Paz Barahona et al. | |
| 7,228,190 | B2 | 6/2007 | Dowling et al. | |
| 7,364,508 | B2 | 4/2008 | Loose et al. | |
| 7,367,886 | B2 | 5/2008 | Loose et al. | |
| 7,449,839 | B1 | 11/2008 | Chen et al. | |
| 7,479,063 | B2 | 1/2009 | Pryzby et al. | |
| 7,666,091 | B2 | 2/2010 | Joshi et al. | |
| 7,682,249 | B2 | 3/2010 | Winans et al. | |
| 7,811,170 | B2 | 10/2010 | Winans et al. | |
| 7,972,214 | B2 | 7/2011 | Kinsley et al. | |
| 8,079,902 | B2 | 12/2011 | Michaelson et al. | |
| 8,591,315 | B2 * | 11/2013 | Gagner et al. | 463/20 |
| 8,613,667 | B2 * | 12/2013 | Brunell et al. | 463/40 |
| 2001/0021666 | A1 | 9/2001 | Yoshida et al. | |
| 2002/0010018 | A1 | 1/2002 | Lemay et al. | |
| 2002/0055978 | A1 | 5/2002 | Joon-Bo et al. | |
| 2002/0160826 | A1 | 10/2002 | Gomez et al. | |
| 2003/0007648 | A1 | 1/2003 | Currell | |
| 2003/0017865 | A1 * | 1/2003 | Beaulieu et al. | 463/16 |
| 2003/0130033 | A1 | 7/2003 | Loose | |
| 2003/0132722 | A1 | 7/2003 | Chansky et al. | |
| 2004/0072610 | A1 | 4/2004 | White et al. | |
| 2004/0160199 | A1 | 8/2004 | Morgan et al. | |
| 2004/0209692 | A1 * | 10/2004 | Schober et al. | 463/42 |
| 2005/0043090 | A1 | 2/2005 | Pryzby et al. | |
| 2005/0044500 | A1 | 2/2005 | Orimoto et al. | |
| 2005/0054440 | A1 | 3/2005 | Anderson et al. | |
| 2005/0077843 | A1 | 4/2005 | Benditt | |
| 2005/0116667 | A1 | 6/2005 | Mueller et al. | |
| 2005/0128751 | A1 | 6/2005 | Roberge et al. | |
| 2005/0164785 | A1 | 7/2005 | Connelly | |
| 2005/0164786 | A1 | 7/2005 | Connelly | |
| 2005/0164787 | A1 | 7/2005 | Connelly | |
| 2005/0164788 | A1 | 7/2005 | Grabiec | |
| 2005/0174473 | A1 | 8/2005 | Morgan et al. | |
| 2005/0239545 | A1 * | 10/2005 | Rowe | 463/29 |
| 2005/0248299 | A1 * | 11/2005 | Chemel et al. | 315/312 |
| 2005/0275626 | A1 | 12/2005 | Mueller et al. | |
| 2005/0277469 | A1 | 12/2005 | Pryzby et al. | |
| 2005/0282631 | A1 | 12/2005 | Bonney et al. | |
| 2006/0009285 | A1 * | 1/2006 | Pryzby et al. | 463/30 |
| 2006/0022214 | A1 | 2/2006 | Morgan et al. | |
| 2006/0025211 | A1 | 2/2006 | Wilday et al. | |
| 2006/0046829 | A1 | 3/2006 | White | |
| 2006/0076908 | A1 | 4/2006 | Morgan et al. | |
| 2006/0253781 | A1 | 11/2006 | Pea et al. | |
| 2007/0004510 | A1 * | 1/2007 | Underdahl et al. | 463/29 |
| 2007/0008711 | A1 | 1/2007 | Kim | |
| 2007/0032288 | A1 * | 2/2007 | Nelson et al. | 463/16 |
| 2007/0036368 | A1 | 2/2007 | Hettinger et al. | |
| 2007/0086754 | A1 | 4/2007 | Lys et al. | |
| 2007/0111776 | A1 | 5/2007 | Griswold et al. | |
| 2007/0189026 | A1 | 8/2007 | Chemel et al. | |
| 2007/0218970 | A1 | 9/2007 | Patel et al. | |
| 2007/0218974 | A1 | 9/2007 | Patel et al. | |
| 2007/0219000 | A1 * | 9/2007 | Aida | 463/42 |
| 2007/0291483 | A1 | 12/2007 | Lys | |
| 2007/0293304 | A1 | 12/2007 | Loose et al. | |
| 2008/0039213 | A1 | 2/2008 | Cornell et al. | |
| 2008/0070685 | A1 | 3/2008 | Pryzby et al. | |
| 2008/0094005 | A1 | 4/2008 | Rabiner et al. | |
| 2008/0113715 | A1 | 5/2008 | Beadell et al. | |
| 2008/0113796 | A1 * | 5/2008 | Beadell et al. | 463/35 |
| 2008/0113821 | A1 * | 5/2008 | Beadell et al. | 463/46 |
| 2008/0161108 | A1 | 7/2008 | Dahl et al. | |
| 2008/0176647 | A1 | 7/2008 | Acres | |
| 2008/0231203 | A1 | 9/2008 | Budde et al. | |
| 2008/0278946 | A1 | 11/2008 | Tarter et al. | |
| 2008/0288607 | A1 | 11/2008 | Muchow | |
| 2008/0309259 | A1 | 12/2008 | Snijder et al. | |
| 2009/0009997 | A1 | 1/2009 | Sanfilippo et al. | |
| 2009/0023485 | A1 | 1/2009 | Ishihata et al. | |
| 2009/0170597 | A1 | 7/2009 | Bone et al. | |
| 2009/0197673 | A1 | 8/2009 | Bone et al. | |
| 2009/0206773 | A1 | 8/2009 | Chang | |
| 2009/0270167 | A1 | 10/2009 | Ajiro et al. | |
| 2009/0298579 | A1 * | 12/2009 | Radek et al. | 463/25 |
| 2009/0318223 | A1 | 12/2009 | Langridge et al. | |
| 2010/0022298 | A1 | 1/2010 | Kukita | |
| 2010/0022305 | A1 | 1/2010 | Yano | |
| 2010/0029385 | A1 * | 2/2010 | Garvey et al. | 463/35 |
| 2010/0031186 | A1 | 2/2010 | Tseng et al. | |
| 2010/0075750 | A1 | 3/2010 | Bleich et al. | |
| 2010/0113136 | A1 | 5/2010 | Joshi et al. | |
| 2010/0171145 | A1 | 7/2010 | Morgan et al. | |
| 2010/0213876 | A1 | 8/2010 | Adamson et al. | |
| 2010/0234107 | A1 | 9/2010 | Fujimoto et al. | |
| 2010/0277079 | A1 | 11/2010 | Van Der Veen et al. | |
| 2010/0309016 | A1 | 12/2010 | Wendt et al. | |
| 2010/0317437 | A1 | 12/2010 | Berry et al. | |
| 2011/0035404 | A1 | 2/2011 | Morgan et al. | |
| 2011/0045905 | A1 * | 2/2011 | Radek | 463/31 |
| 2011/0050101 | A1 | 3/2011 | Bailey et al. | |
| 2011/0070948 | A1 * | 3/2011 | Bainbridge et al. | 463/30 |
| 2011/0118018 | A1 | 5/2011 | Toyoda | |
| 2011/0190052 | A1 | 8/2011 | Takeda et al. | |
| 2012/0009995 | A1 | 1/2012 | Osgood | |
| 2012/0040738 | A1 | 2/2012 | Lanning et al. | |
| 2012/0129601 | A1 | 5/2012 | Gronkowski et al. | |
| 2012/0178523 | A1 | 7/2012 | Greenberg et al. | |
| 2012/0178528 | A1 | 7/2012 | Brunell et al. | |
| 2013/0184078 | A1 | 7/2013 | Brunell et al. | |

FOREIGN PATENT DOCUMENTS

| | | |
|---|---|---|
| WO | WO-2004014501 | 2/2004 |
| WO | WO2004075128 | 9/2004 |
| WO | WO-2004075128 | 9/2004 |
| WO | WO-2004075129 | 9/2004 |
| WO | WO2004075129 | 9/2004 |
| WO | WO2004086320 | 10/2004 |
| WO | WO-2005113089 | 12/2005 |
| WO | WO2005113089 | 12/2005 |
| WO | WO2005114598 | 12/2005 |
| WO | WO-2005114598 | 12/2005 |
| WO | WO-2005114599 | 12/2005 |
| WO | WO2005114599 | 12/2005 |
| WO | WO-2005117647 | 12/2005 |
| WO | WO2005117647 | 12/2005 |
| WO | WO-2006017444 | 2/2006 |
| WO | WO2006017444 | 2/2006 |
| WO | WO-2006017445 | 2/2006 |
| WO | WO2006017445 | 2/2006 |
| WO | WO2006033941 | 3/2006 |
| WO | WO-2006033941 | 3/2006 |
| WO | WO2006039284 | 4/2006 |
| WO | WO-2006039284 | 4/2006 |
| WO | WO-2006039323 | 4/2006 |
| WO | WO2006039323 | 4/2006 |
| WO | WO-2006125013 | 11/2006 |
| WO | WO2006125013 | 11/2006 |
| WO | WO-2007022294 | 2/2007 |
| WO | WO2007022294 | 2/2007 |
| WO | WO2007022343 | 2/2007 |
| WO | WO-2007022343 | 2/2007 |
| WO | WO-2007061904 | 5/2007 |
| WO | WO-2007133566 | 11/2007 |
| WO | WO2007133566 | 11/2007 |
| WO | WO-2008057538 | 5/2008 |
| WO | WO2008057538 | 5/2008 |
| WO | WO-2008063391 | 5/2008 |
| WO | WO2008063391 | 5/2008 |
| WO | WO-2008137130 | 11/2008 |
| WO | WO2008137130 | 11/2008 |
| WO | WO-2009054930 | 4/2009 |
| WO | WO2009054930 | 4/2009 |
| WO | WO2010048068 | 4/2010 |
| WO | WO-2010048068 | 4/2010 |
| WO | WO-2011005797 | 1/2011 |
| WO | WO2011005798 | 1/2011 |

(56) References Cited

FOREIGN PATENT DOCUMENTS

| | | |
|---|---|---|
| WO | WO-2011005798 | 1/2011 |
| WO | WO2011014760 | 2/2011 |
| WO | WO-2011014760 | 2/2011 |
| ZA | 20041110 | 8/2005 |

OTHER PUBLICATIONS nyphinix13, Star Wars Cloud City Slot Bonus—IGT, Mar. 18, 2010, http://www.youtube.com/watch?v=wfYL9hjLxg4.*
24Hr-Slots, Elvis Little More Action, Sep. 5, 2009, http://www.24hr-slots.co.uk/WagerWorks/Elvis_ALMA.html.*
IGT, Coyote Moon, 2005, http://web.archive.org/web/20131213220054/http://media.igt.com/marketing/Promotional-Literature/GamePromoLit_111E3-29BC7.pdf.*
U.S. Appl. No. 12/797,756, filed Jun. 10, 2010, Berry, Robert G., et al.
U.S. Appl. No. 12/860,467, filed Aug. 20, 2010, Radek, Paul J.
U.S. Appl. No. 12/965,749, filed Dec. 10, 2010, Brunell, Edward G., et al.
U.S. Appl. No. 12/971,544, filed Dec. 17, 2010, Brunell, Edward G., et al.
U.S. Appl. No. 13/094,701, filed Apr. 26, 2011, Brunell, Edward G., et al.
U.S. Appl. No. 13/109,427, filed May 17, 2011, Brunell, Ed et al.
U.S. Appl. No. 13/094,560, filed Apr. 26, 2011, Brunell, Edward G., et al.
"PCT Application No. PCT/US10/41112 International Search Report", Sep. 2, 2010 , 11 pages.
"PCT Application No. PCT/US10/43886 International Search Report", Sep. 16, 2010 , 12 pages.
"U.S. Appl. No. 13/094,560 Office Action", Mar. 30, 2012 , 13 pages.
"U.S. Appl. No. 13/094,701 Office Action", Mar. 27, 2012 , 26 pages.
"U.S. Appl. No. 12/965,749 Office Action", Nov. 8, 2012 , 30 pages.
"U.S. Appl. No. 12/971,544 Office Action", Nov. 6, 2012 , 43 pages.
"U.S. Appl. No. 13/094,701 Final Office Action", Nov. 28, 2012 , 14 pages.
"U.S. Appl. No. 12/860,467 Office Action", Jan. 17, 2013 , 16 pages.
"U.S. Appl. No. 12/971,544 Final Office Action", Mar. 14, 2013, 38 pages.
Gusella, Riccardo et al., "An Election Algorithm for a Distributed Clock Synchronization Program", *Berkley* http://www.eecs.berkeley.edu/Pubs/TechRpts/1986/CSD-86-275.pdf Dec. 1985, 19 pages.
"PCT Application No. PCT/US10/41111 International Preliminary Report on Patentability", Oct. 24, 2011 , 13 pages.
"PCT Application No. PCT/US10/41111 International Search Report", Sep. 1, 2010 , 12 pages.
"PCT Application No. PCT/US10/41112 International Preliminary Report on Patentability", Aug. 31, 2012 , 4 pages.
"PCT Application No. PCT/US10/43886 International Preliminary Report on Patentability", May 3, 2012 , 4 pages.
"U.S. Appl. No. 12/965,749 Final Office Action", Apr. 22, 2013 , 30 Pages.
"U.S. Appl. No. 13/204,225 Office Action", Feb. 27, 2013 , 19 pages.
"U.S. Appl. No. 13/204,225 Office Action", Jun. 22, 2012 , 23 pages.
"U.S. Appl. No. 13/382,738 Office Action", Sep. 24, 2013 , 24 Pages.
"U.S. Appl. No. 13/382,738 Office Action", Feb. 7, 2013 , 41 pages.
"U.S. Appl. No. 13/382,783 Office Action", Feb. 28, 2012 , 26 pages.
"U.S. Appl. No. 13/382,783 Office Action", Jul. 25, 2013 , 20 Pages.
"U.S. Appl. No. 12/797,756 Office Action", Nov. 7, 2013 , 7 Pages.
"U.S. Appl. No. 12/965,749 Office Action", Dec. 17, 2013 , 35 Pages.
"U.S. Appl. No. 13/094,560 Office Action", Dec. 6, 2013 , 9 Pages.
"U.S. Appl. No. 13/388,118 Office Action", Oct. 11, 2013 , 9 Pages.

* cited by examiner

COORDINATING MEDIA IN A WAGERING GAME ENVIRONMENT

RELATED APPLICATIONS

This application claims the priority benefit of U.S. Provisional Application Ser. No. 61/412,304 filed Nov. 10, 2010 and U.S. Provisional Application Ser. No. 61/327,871 filed Apr. 26, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly wagering game systems that coordinate media between different media shows.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines.

Some wagering game systems attempt to enhance player experiences using multimedia, such as lighting effects, video, and sound. These systems may offer basic coordination between various media types (e.g., lighting and sound), while presenting other media independently (e.g., blinking lights may operate independent of other media). As wagering game systems evolve, those offering more sophisticated media presentations will likely attract more players.

BRIEF DESCRIPTION OF THE FIGURES

Embodiments of the invention are illustrated in the Figures of the accompanying drawings in which.

DESCRIPTION OF THE EMBODIMENTS

Introduction

This section introduces some embodiments of the inventive subject matter.

Some casinos include media systems that present casino-wide multimedia shows on media devices located about the casinos. For example, a casino may have overhead lights and overhead audio speakers that present coordinated audio and lighting shows to entertain and attract players. Coordinated media shows may be celebrations for a large jackpots and other gaming events.

Figure 1:
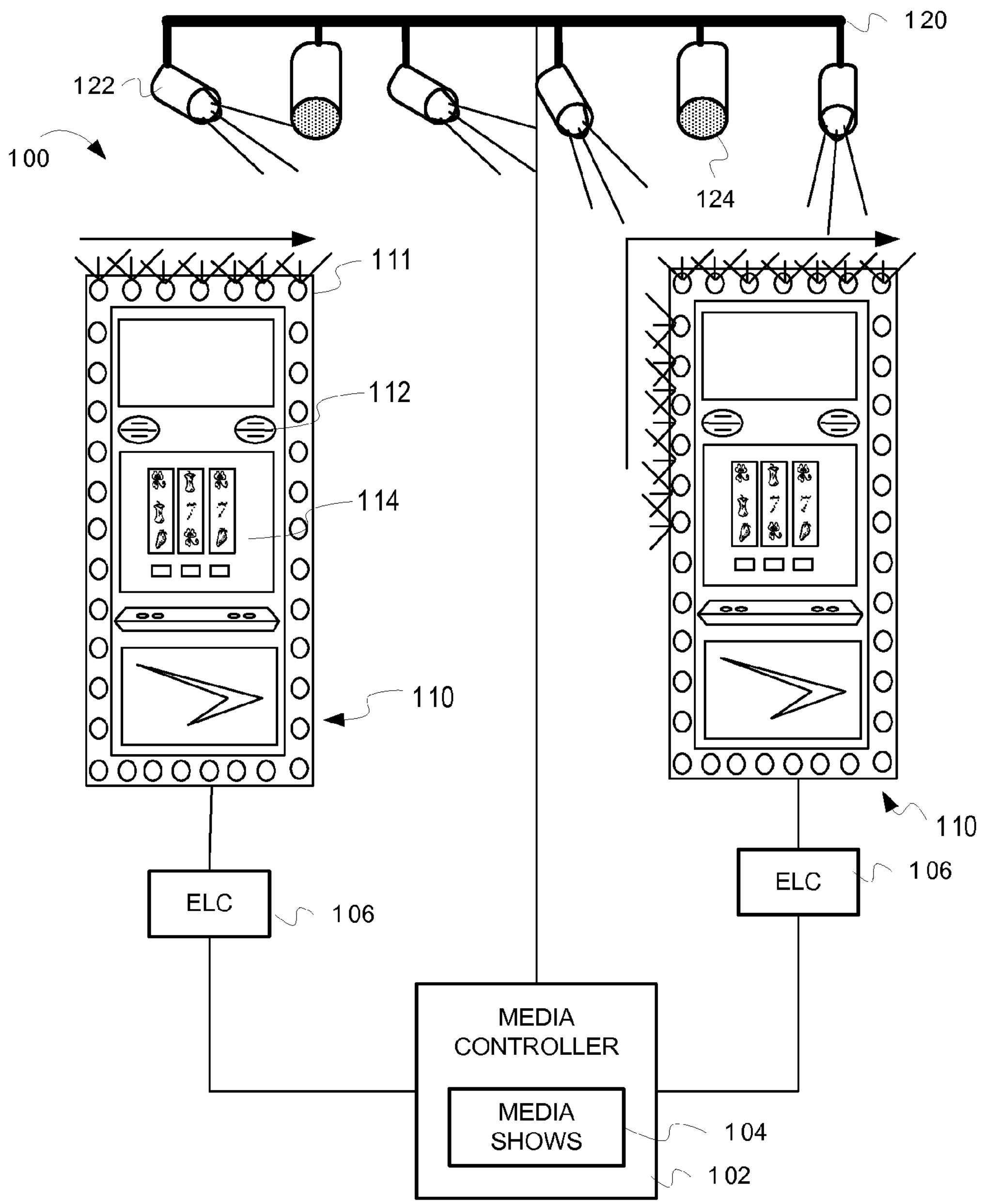
FIG. 1 shows more details about a system that presents casino-wide multimedia shows.

FIG. 1 shows more details about a system that presents casino-wide multimedia shows. In FIG. 1, a system 100 includes a media controller 102 connected to an overhead media device 120, which includes lighting devices 122 and audio speakers 124. The media controller 102 is also connected to emotive lighting controllers 106, which are connected to wagering game machines 110. The media controller 102 can present casino-wide media shows by transmitting commands and data to the overhead media device 120, which presents lighting and audio based the commands and data. The media controller 102 may also transmit commands and data to the emotive lighting controllers 106. The emotive lighting controllers 106 can control presentation of media on the wagering game machines' audio speakers 112, and lighting devices 111. Thus, the media controller 102 can control a casino-wide media show that presents overhead audio and lighting on the overhead media device 120, and floor-level audio and lighting on the wagering game machine's audio speakers 112 and lighting devices 111.

As noted above, the show's audio and video content can be coordinated, such as to create an aesthetically pleasing media presentation. For example, light coloring can be coordinated using harmonious colors. Furthermore, light coloring and flashing can be synchronized to audio content, such as by synchronizing light flashing and light color changes to beats in the audio content.

These casino-wide media shows are separate from media appearing on wagering game machines in the casino. For example, wagering games appearing on the wagering game machines 110 can include animations, graphics, and other video effects that are not related to casino-wide media shows. Thus, although such shows coordinate their own lighting, audio, and other media, these shows may conflict with media included in wagering games. For example, overhead light colors may conflict with coloring of game elements appearing on the casino's wagering game machines.

Figure 2:
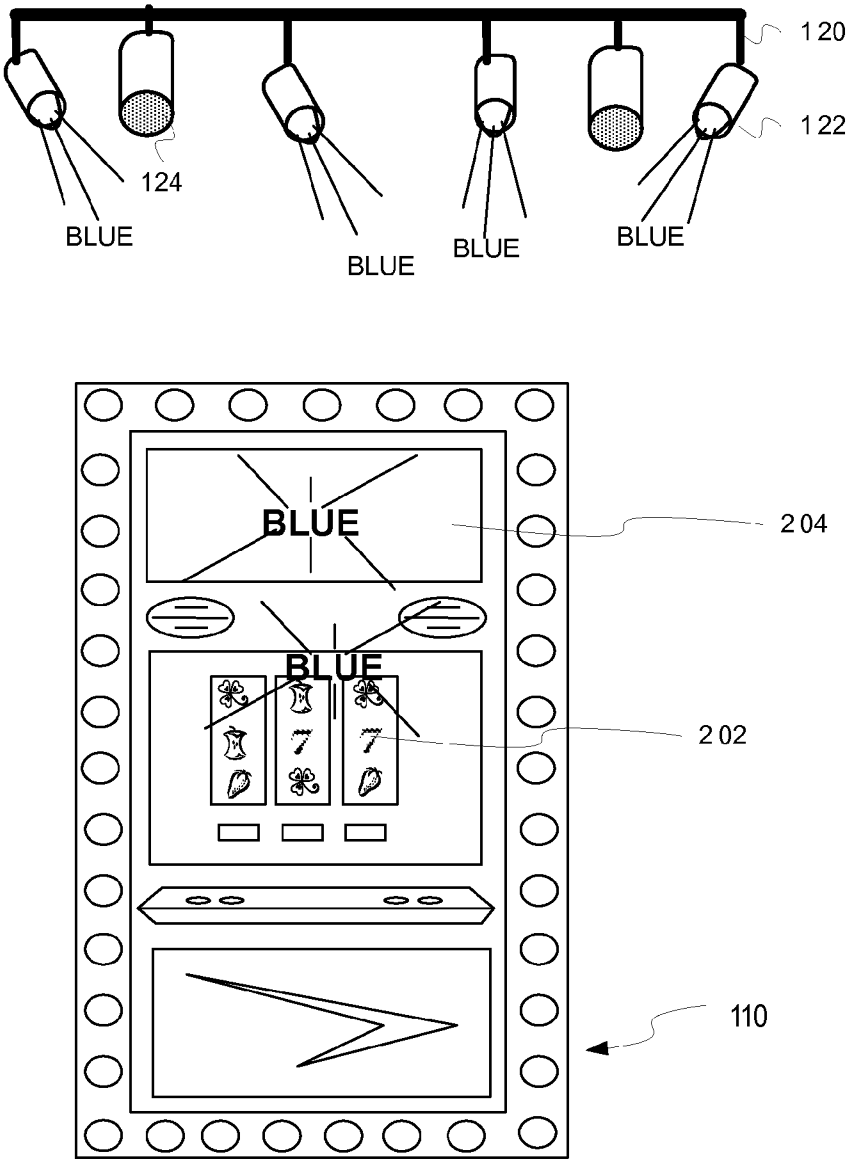
FIG. 2 is a conceptual diagram illustrating how a wagering game machine can configure coloring for game elements and game animations based on casino-wide media shows.

Some embodiments of the inventive subject matter enable wagering game machines to coordinate wagering game media with casino-wide media shows. In some instances, wagering game machines can determine light coloring of casino-wide media shows. In turn, the wagering game machines can coordinate coloring of wagering game elements (e.g., reel symbols for slots games) to match light coloring of the casino-wide media show. For example, for casino-wide media shows that include blue lighting, wagering game machines can configure reel symbols and top box animations to glow blue. FIG. 2 shows this in more detail.

FIG. 2 is a conceptual diagram illustrating how a wagering game machine can configure coloring for game elements and game animations based on casino-wide media shows. As shown in FIG. 2, the overhead media device 120 is presenting, on its lighting devices 122, blue lighting as part of a casino-wide media show. At the same time, the wagering game machine 110 is presenting graphics 202 representing a spinning-reels slots game. As noted above, typically wagering game machines present graphics and game elements that are separate from any casino-wide media show. That is, wagering game machines themselves typically select and control their own graphics and game elements. However, according to some embodiments of the inventive subject matter, wagering game machines can coordinate their graphics, game elements, and other game-related media with casino-wide media. For example, as shown in FIG. 2, the wagering game machine 110 can detect that the casino-wide media includes blue overhead lighting. To coordinate with the blue overhead lighting, the wagering game machine 110 configures its graphics 202 (e.g., reel symbols for a slots game) to be blue in color.

Although FIG. 2 shows the wagering game machine's graphics 202 matching the casino-wide media (see text representing blue colors), the wagering game machine 110 can select coordinating colors that do not match the casino-wide show. That is, the wagering game machine 110 can select colors that aesthetically complement casino-wide media content. For example, the wagering game machine 110 can configure its graphics 202 to include greens and reds, which complement blues in the casino-wide media presentation.

Additionally, in some embodiments, the wagering game machine 110 can detect information about audio and other content in the casino-wide media presentation. As a result, the wagering game machine 110 can synchronize animations and other media to audio in a casino-wide media presentation. For example, the wagering game machine 110 can present a bonus game in which graphical game elements move synchronously with audio beats (e.g., presented on the audio speakers 124) of a casino-wide media presentation.

The following sections describe additional details about these and other embodiments of the inventive subject matter.

Example Operating Environment

This section describes an example operating environment and provides structural aspects of some embodiments of the inventive subject matter. This section will discuss components that present casino-wide media shows, and wagering game machines that coordinate gaming content with the casino-wide media shows. This section will also describe the media shows in more detail.

Figure 3:
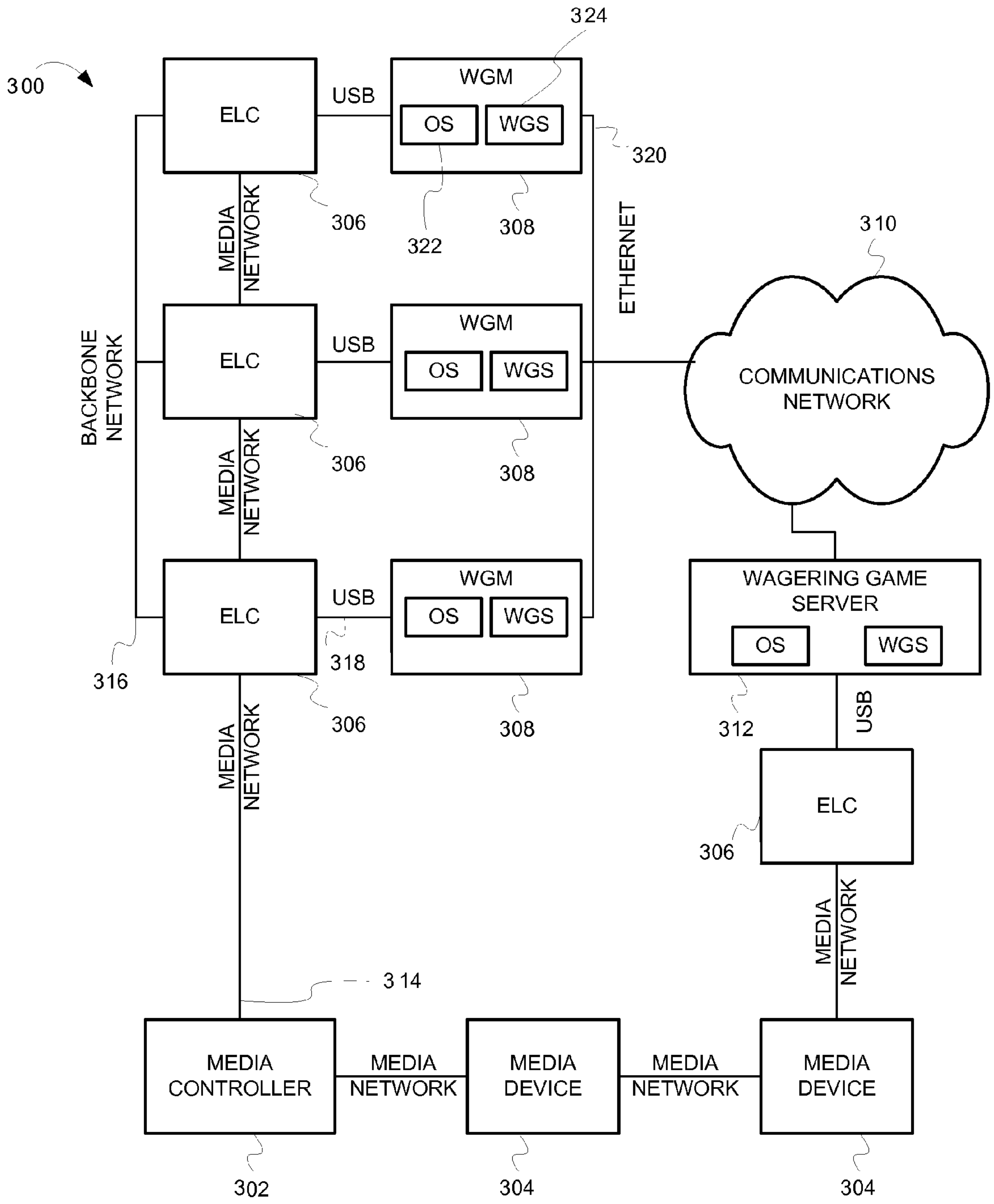
FIG. 3 is a block diagram illustrating a system capable of presenting coordinated casino-wide media shows, according to some embodiments.

FIG. 3 is a block diagram illustrating a system capable of presenting coordinated casino-wide media shows, according to some embodiments. In FIG. 3, a media network 314 connects a media controller 302 to media devices 304 and emotive lighting controllers 306 in a daisy chain fashion. In addition to the media network 314, a backbone network 316 connects the emotive lighting controllers 306 together. In some embodiments, the media network 314 includes RS-485 cabling, and can transmit traffic according to versions of the DMX protocol (e.g., DMX512 or DMX512-A). The backbone network 316 can include RS-485 technology, Ethernet technology, or any other suitable networking technology. The backbone network 314 enables the emotive lighting controllers 306 to communicate without consuming bandwidth on the media network 314. In some instances, the emotive lighting controllers 306 can use the backbone network 316 to coordinate media shows involving media devices (e.g., lighting devices) on the wagering game machines 308. Such media shows can be separate from casino-wide shows that involve the media devices 304.

Each emotive lighting controller 306 is connected to a wagering game machine 308 via a universal serial bus connection 318. Although not shown in FIG. 3, the wagering game machines 308 include media devices, such as lighting devices audio speakers, video monitors, etc. The wagering game machines 308 also include operating systems 322 and wagering game units 324. The wagering game machines 308 can be arranged in any suitable fashion (e.g. side-by-side in a bank, etc.). Each wagering game machine 308 is connected, via an Ethernet network 320, to the communications network, which is connected to a wagering game server 312.

As shown, the wagering game server 312 includes an operating system and wagering game unit. In some embodiments, the wagering game server's wagering game unit determines outcome for wagering games that are presented on the wagering game machines 308. Thus, in some instances, the wagering game machines 308 act as clients that present wagering games determined by the wagering game server 312. In FIG. 3, the wagering game server 312 is connected to an emotive lighting controller 306. In some embodiments, additional devices are connected to the communications network 310, such as accounting servers, media servers, wagering game community servers, etc. Although FIG. 3 shows a limited number of components, embodiments of the system 300 can include any suitable number of media controllers 302, media devices 304, emotive lighting controllers 306, wagering game machines 308, etc.

In operation, the media controller 302 can control casino-wide media shows that include content presented on the media devices 304 and media devices in the wagering game machines 308. When controlling casino-wide media shows, some embodiments of the media controller 302 transmit commands and data to the media devices 304 and emotive lighting controllers 306. The media devices 304 receive the commands and data, and present media (e.g. lighting, audio, etc.) based on those commands and data. Similarly, the emotive lighting controllers 306 receive the commands and data and present media based on the commands and data, such as by presenting lighting and audio content on media devices attached to a wagering game machine 308.

Because the emotive lighting controllers 306 are connected to the wagering game machines 308, the emotive lighting controllers 306 can notify the machines 308 about the media controller's commands and data. After learning of the media controller's commands and data, the wagering game machines 308 can configure their graphics (e.g., game elements such as reel symbols), audio, video, and other media to coordinate with casino-wide media shows. For example, the media controller 302 may broadcast, to the emotive lighting controllers 306 and media devices 304, lighting commands indicating blue lighting for a casino-wide media show. After learning about the blue lighting commands, the emotive lighting contros 306 can notify the wagering game machines 308 about the blue lighting commands. In response, the wagering game machines 308 can configure wagering game graphics (e.g. reel symbols and other game elements) to be blue, or another color that aesthetically coordinates with the casino-wide show's blue lighting.

Any component of the system 300 can include hardware, firmware, and/or machine-readable storage devices including instructions for performing the operations described herein. Machine-readable storage devices include any devices that store information in a form readable by a machine (e.g., a wagering game machine, computer, etc.). For example, machine-readable storage devices include read only memory (ROM), random access memory (RAM), magnetic disk storage media, optical storage media, flash memory machines, etc.

The media devices 304 can be arranged anywhere in a casino, and can include any suitable lighting devices. Such lighting devices can include a plurality of light sources, such as light emitting diodes (LEDs), incandescent lights, and/or any other suitable light source. In some embodiments, each light is separately addressable and programmable. Programming parameters can include color, brightness, blink frequency and duration, fade in/out rate, etc. In some embodiments, the lighting devices can pivot, rotate, tilt, pan, telescope, or otherwise move. In some instances, each light can move independently, while in other instances, all the lights move as a unit. The lighting devices can also include reflectors (stationary or movable) that facilitate various lighting effects. In addition to lighting devices, the media devices can include audio presentation devices (e.g., audio speakers), video presentation devices (e.g., video monitors), etc.

In some embodiments, the wagering game machines 308 include data for presenting the media shows, including casino-wide shows and local shows. The data can include audio content (e.g., MP3 files, WAV files, etc.), video content (e.g., MPEG files, QuickTime® files, MOV files, etc.), lighting content, and other suitable content. The media files can include markers used for synchronizing presentations across multiple media types, such as synchronizing lighting effects with audio content. In some instances, the content may be streamed from a media server to the machines for presentation (via Ethernet 320), or the machines may download the data (e.g., media files) just-in-time for a media show.

Example Operations

Figure 4:
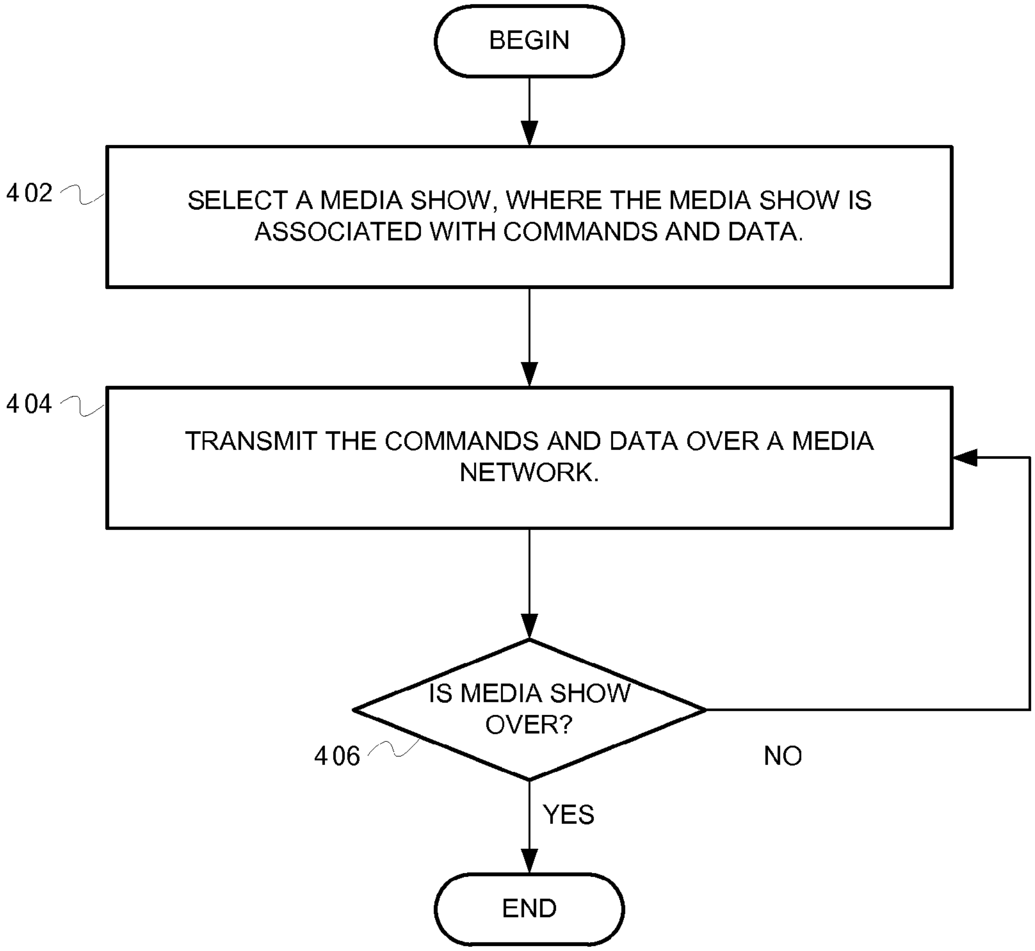
FIG. 4 is a flow diagram illustrating operations for controlling a casino-wide media show, according to some embodiments of the invention.
Figure 5:
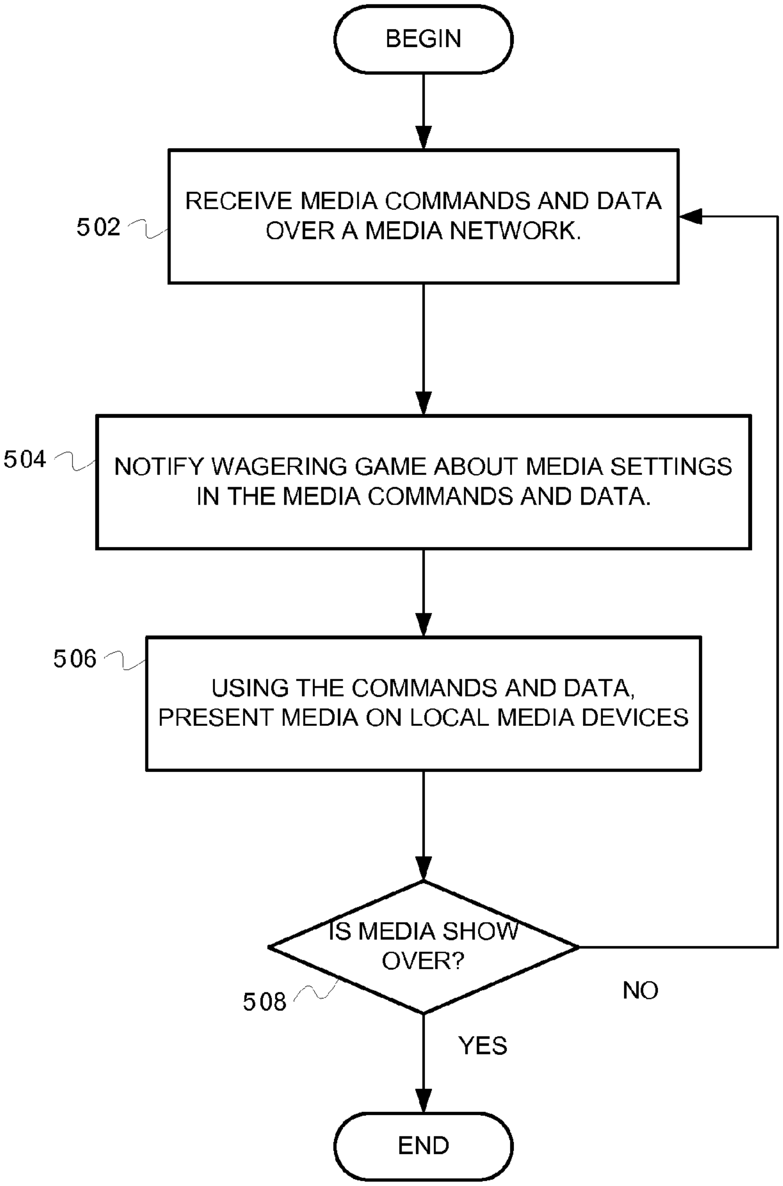
FIG. 5 is a flow diagram illustrating operation or notifying a wagering game machine about media commands received over a media network, according to some embodiments of the invention.
Figure 6:
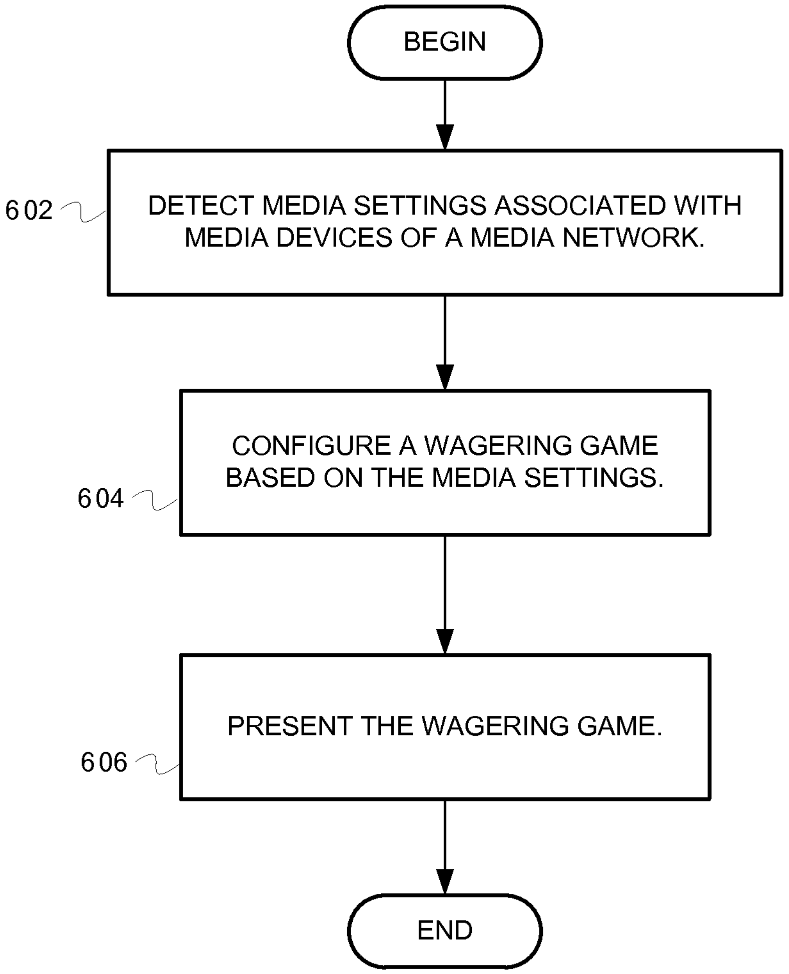
FIG. 6 is a flow diagram illustrating operations for configuring wagering game graphics to coordinate with casino-wide media shows, according to some embodiments of the invention.

This section presents FIGS. 4-6. These Figures explain how wagering game machines can use information for controlling casino-wide media shows to configure their own media. More specifically, FIG. 4 describes how a media controller broadcasts information for controlling a casino-wide media show, whereas FIG. 5 describes how emotive lighting controllers process such information. FIG. 6 explains how wagering game machines receive the information and use it to configure their own media.

This section describes operations performed by some embodiments of the invention. In the discussion below, flow diagrams will be described with reference to the block diagrams presented above. In certain embodiments, the operations are performed by executing instructions residing on machine-readable storage media (e.g., software), while in other embodiments, the operations are performed by hardware, firmware, and/or other components. In some embodiments, the operations are performed in series, while in other embodiments, one or more of the operations can be performed in parallel.

FIG. 4 is a flow diagram illustrating operations for controlling a casino-wide media show, according to some embodiments of the invention. In some instances, a media controller 302 performs the operations shown in FIG. 4. In FIG. 4, flow begins at block 402, where the media controller 302 selects a media show that includes media commands and/or data for presenting media on the media devices 304. As noted above, the media devices 304 can be positioned anywhere in a casino to achieve a casino-wide media show. The flow continues at block 404.

At block 404, the media controller 302 transmits the media commands and/or data over the media network 314. In some embodiments, the transmission is a broadcast to all devices connected to the media network 314. For example, the media controller 302 may broadcast, over the media network 314, data packets including media commands and data. In some instances, the commands are intended for specific media devices, so the media controller 302 can address commands to the specific media devices 304. Each media device 304 can receive broadcast packets (e.g., DMX512 packets), and process media commands and/or data residing at a certain address in the packets. In turn, the media devices 304 present media, such as lighting effects, video, audio effects, etc. The flow continues at block 406.

At block 406, the media controller 302 determines whether the media show is over. If the media show is over, the flow ends. Otherwise, the flow continues at block 404, where the media controller 302 continues transmitting commands and data associated with a media show.

Thus, as described vis-à-vis FIG. 4, embodiments of the media controller 302 transmit media commands and/or data that cause media devices to present media throughout a casino. The media controller's media commands and/or data do not directly affect wagering games and other media controlled by the wagering game machines 308. However, according to embodiments of the inventive subject matter, wagering game machines can detect the media commands and/or data, and configure their media to coordinate with casino-wide media shows.

As shown in FIG. 3, the media controller 302 transmits media commands and/or data to the emotive lighting controllers (ELCs) 306. FIG. 5 describes how some embodiments of the ELCs process media commands, and notify wagering game machines about the media commands.

FIG. 5 is a flow diagram illustrating operation for notifying a wagering game machine about media commands received over a media network, according to some embodiments of the invention. In FIG. 5, the flow 500 begins at block 502.

At block 502, an ELC 306 receives media commands and/or data over the media network 314. The media commands can be for any suitable media device, such as lighting devices, audio devices, video presentation devices, etc. In some embodiments, the ELC 306 can parse the media commands to determine settings for the media devices 304. The settings can be for lighting devices, video displays, audio presentation devices, overhead signs, etc. In some instances, the settings can indicate color, flash rate, brightness, light device rotation and position, video file selection, audio file selection, volume, treble, base, balance, fade, etc. The ELC 300 can also parse the media commands to determine synchronization information associated with a media show. In other embodiments, the ELC 306 does not parse the media commands and/or data. The flow continues at block 504.

At block 504, the ELC 306 notifies the wagering game machine 308 about the media commands and/or data. In some embodiments, the ELC 306 transmits the media commands and/or data to the wagering game machine 308 over the universal serial bus (USB) connection 118. For embodiments where the ELC 306 parses media commands to determine media settings, the ELC 306 may transmit one or more of the media settings, instead of transmitting the media commands and/or data. In some instances, the ELC 306 transmits media information (e.g., media commands, media settings, etc.) to an operating system 322 in the wagering game machine 308 (e.g., via a USB port in the machine 308). The wagering game machine's operating system 322 can, in turn, deliver the media information to a wagering game unit 324 and other components of the wagering game machine 308. The flow continues at block 506.

At block 506, the ELC 306 presents media based on the media commands and/or data received over the media network 314. In some instances, the ELC 306 controls media devices mounted on a wagering game machine 308. For example, the ELC 306 can control, based on the media commands, lights mounted on a wagering game machine (e.g., see light devices 111 in FIG. 1). Using the media commands received over the media network 314, the ELC 306 can present lighting effects, such as colored streaking lighting, colored flashing lighting, color changes, etc. Such lighting effects may be part of a casino-wide media show for attracting players, entertaining players, celebrating large jackpots, creating certain moods, etc. The flow continues at block 508.

At block 508, the ELC 306 determines whether the media show is over. For example the ELC 306 determines whether it has more media commands to process. If the media show is over, the flow ends. Otherwise, the flow continues at block 502. In some embodiments, the ECL 306 determines whether a media show has ended by monitoring a channel in the media network 314 for an indication that the media show is over. However, in other embodiments, media shows are not given defined durations, so the ELC 306 does not look for an end to media shows. In such an embodiment, the ELC 306 continuously loops through the operations at blocks 502, 504, and 506.

As noted in the discussion of block 504, the ELCs forward media information to the wagering game machines. This discussion continues with a description of how the wagering game machines process the media information received from the ELCs.

FIG. 6 is a flow diagram illustrating operations for configuring wagering game graphics to coordinate with casino-wide media shows, according to some embodiments of the invention. The flow 600 begins at block 602.

At block 602, the wagering game machine 308 detects media information associated with a casino-wide media show. In some embodiments, the wagering game machine 308 includes an operating system 322 that receives the media information from an ELC 306 over a USB connection. In such an embodiment, the operating system 322 polls the ELC 306 for media information via a USB pipe. After the operating system 322 receives the media information, the operating system can make the media information available to wagering game software executing on the wagering game machine 308. For embodiments that do not utilize USB, the operating system can include components that detect and receive input (i.e., the media information) from the ELC 306 over a bus (e.g., PCI bus, ISA bus, etc.), and deliver the input to a wagering game unit 324. In some embodiments, the media information can include media commands and/or data, media settings determined by the ELC, and any other information indicating aspects of a casino-wide media show. The flow continues at block 604.

At block 604, the wagering game machine's wagering game unit 324 configures wagering game media based on the media information associated with the casino-wide media show. In some embodiments, the media information indicates lighting color in the casino-wide media show. The wagering game unit 324 can configure coloring of game elements, such as reel symbols and playing cards, thematic art work, and other graphics based on the media information. As a result, the wagering game machine 308 can configure its wagering games to present media that aesthetically coordinates with the casino-wide media shows, which are controlled outside the wagering game machine 308. Additional details about configuring wagering game media are provided below, after the discussion of FIG. 6. The flow 600 continues at block 606.

At block 606, the wagering game machine presents wagering games that include media which was configured based information for a casino-wide media show. For example, the wagering game unit 324 can present a slots game in which the reel symbols are colored blue to match a casino-wide media show's blue lighting. In some embodiments, the wagering game graphics and other settings can be configured to be discordant with the casino-wide media show. From block 606, the flow ends.

Although the discussion of FIG. 6 describes a wagering game machine performing the flow 600. In embodiments where a wagering game server determines game outcomes that are presented on the wagering game machines, the operations of the flow 600 may be performed by the wagering game server. Thus, in some embodiments, the wagering game server can configure elements and settings of wagering games based on media information associated with casino-wide media shows.

As noted above, the media information can indicate media settings such as, lighting settings (e.g., color, brightness, flash rate, flash pattern, etc.), audio settings (e.g., volume, treble, bass, etc.), video settings (e.g., brightness, resolution, frame rate, etc.), overhead sign settings (e.g., positioning, lighting settings, etc.), and more. According to embodiments, a wagering game unit can configure any of the following based on the media information:

- Game Elements—slots reel symbols, playing cards, roulette numbers, and any other graphics that indicate a result of a wagering game.
- Secondary Game Graphics—graphics that represent objects other than elements the wagering game, such as a dealer in a video poker game, a border, a background, thematic art, etc.
- Game Lighting—lighting shows presented on and by the wagering game machine can be created as templates, where a color scheme for the lighting show is determined based on incoming media information (e.g., media information received at block 606).
- Game Audio—audio sound tracks and other sound effects presented during a wagering game.
- Attract Mode Media—audio, lighting, and media presented when the wagering game machine in not conducting a wagering game session.
- Fonts—fonts used for presenting wagering-game-related text, and text not related wagering games.
- Glow Effects—graphical effects that make objects appear to be glowing, wherein the glow has a particular color.
- Integrated Environments—lighting effects that create shadowing and other lighting effects for game graphics based on media information about light sources in the casino (e.g., lighting emanating from a media device mounted over the wagering game machine).
- Transparency—transparency for graphical objects including game elements, secondary game graphics, etc.
- Game Element Selection—the wagering game unit can select game elements based on media information, such as selecting elements of a particular theme (holiday theme, sports theme, etc.) based media information (e.g., received at block 606).

In some embodiments, when a wagering game machine is configuring media, it can look-up preconfigured media configuration or it can determine media based on heuristics or algorithms. For example, after receiving media information indicating a lighting color, the wagering game machine can look up color values that are associated with values in the media information. Alternatively, the machine can determine a color match by inspecting a color value in the media information, and determining a closest supported color value based on any suitable color matching technique. In some embodiments, the wagering game machines include color pallets that indicate color schemes that coordinate with colors received in the media information. The pallets can be predetermined, and they can include coordinating colors, such as different shades of a color indicated in the media information, different yet complimentary colors, etc. In some instances, the pallets include discordant colors to illicit certain lighting effects.

Although this discussion refers to media shows as being presented casino-wide, some casino-wide media shows may be presented in only a portion of a casino.

More About Wagering Game Machines

Figure 7:
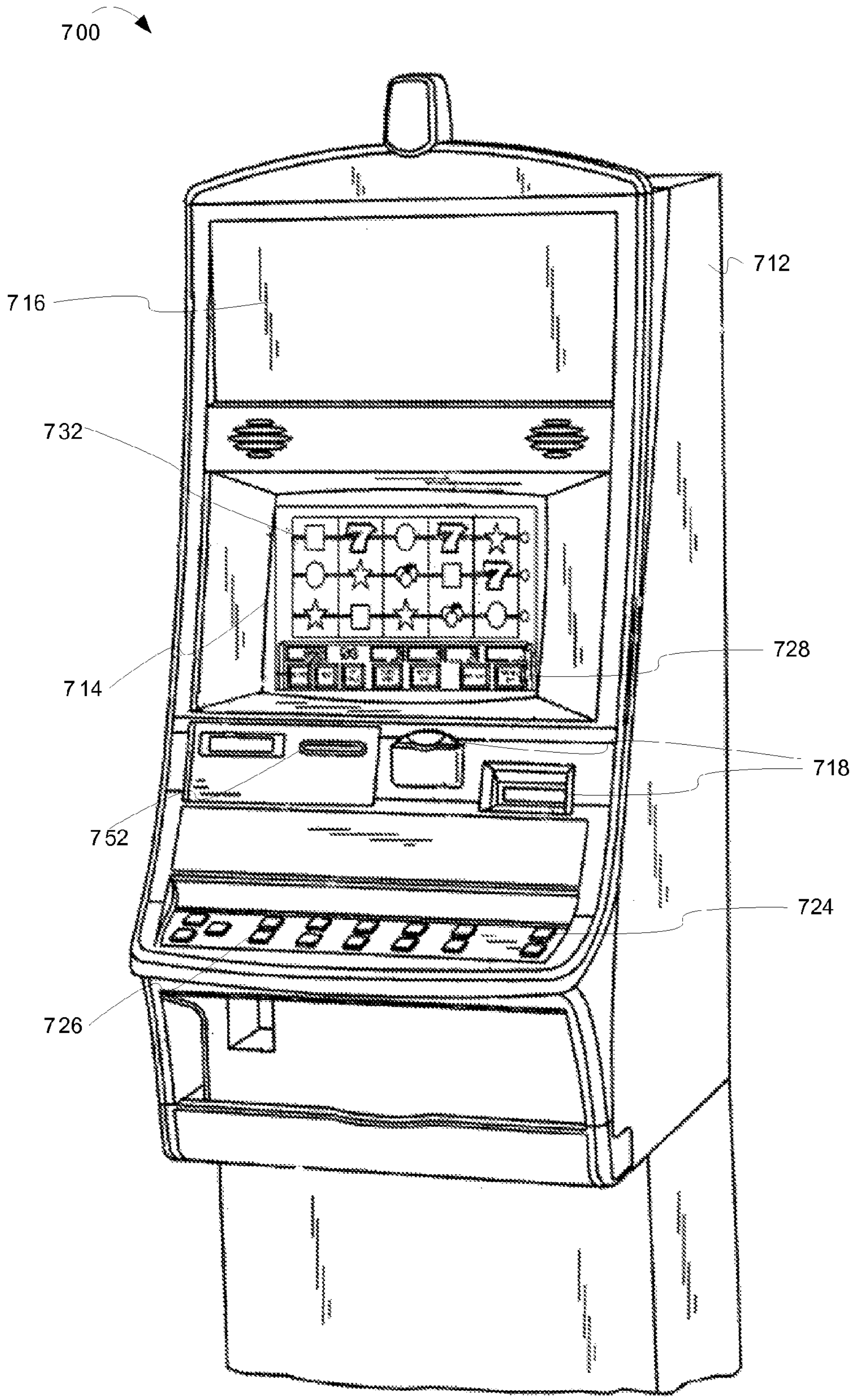
FIG. 7 is a perspective view of a wagering game machine, according to example embodiments of the invention.

FIG. 7 is a perspective view of a wagering game machine, according to example embodiments of the invention. Referring to FIG. 7, a wagering game machine 700 is used in gaming establishments, such as casinos. The wagering game machine 700 can be one implementation of the wagering game machines shown in FIG. 3. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc. Additionally, the wagering game machine can include lighting devices and other components for presenting media content, as described herein.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bar top model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A wagering game machine comprising:

an interface configured to receive media information from an emotive lighting controller remote from the wagering game machine, wherein the media information indicates settings for media devices remote from the wagering game machine;

an operating system configured to detect receipt of the media information over the interface, and to deliver the media information to a wagering game unit;

the wagering game unit configured to receive the media information from the operating system;

select, based on the media information, graphical game elements that coordinate with the settings for the media devices, wherein the graphical game elements are used in a wagering game occurring on the wagering game machine; and present the wagering game including the graphical game elements.

2. The apparatus of claim 1, wherein selection of the graphical game elements includes selection of colors for the graphical game elements, wherein the selection of colors is based on the media information.

3. The apparatus of claim 1, wherein the wagering game unit is further configured to configure, based on the media information, audio effects of the wagering game, and to present the audio effects during the presentation of the wagering game.

4. The apparatus of claim 1, wherein the media information also includes commands and indicates settings form media devices included in the wagering game machine.

5. The apparatus of claim 1, wherein the settings include one or more of lighting color, lighting flash rate, lighting brightness, audio volume, audio treble level, audio base level, video resolution, and video brightness.

6. A system comprising:

a plurality of media devices positioned throughout a casino, wherein the media devices are configured to present a coordinated media show throughout the casino;

a media controller connected to the media devices via a media network, wherein the media controller is configured to transmit media commands over the media network to the media devices, wherein the media commands cause the media devices to present the coordinated media show;

a plurality of emotive lighting controllers connected to the media network, wherein the emotive lighting controllers are configured to receive the media commands, and transmit the media commands to wagering game machines;

the wagering game machines configured to receive the media commands;

configure, based on the media commands, media settings that determine audio and video content produced by wagering games; and present the wagering games according to the media settings.

7. The system of claim 6, wherein the media settings include coloring for game elements of the wagering games.

8. The system of claim 6, wherein the media settings include audio settings for sound effects of the wagering games.

9. The system of claim 6, wherein the wagering game machines include media devices, and wherein the emotive lighting controllers are further configured to present media on the media devices included in the wagering game machines.

10. The system of claim 6, wherein the plurality of media devices include one or more of audio speakers, lighting devices, and video presentation devices.

11. A method for coordinating media of a wagering game with a casino-wide media show, the method comprising:

receiving, in an operating system executing on one or more processors in a wagering game machine, color information indicating color settings for a casino-wide light show external to the wagering game machine;

providing, by the operating system, the color information to a wagering game unit executing on at least one of the one or more processors in the wagering game machine;

selecting, by the wagering game unit, a color scheme for game elements of a wagering game, the selecting based on the color information;

presenting, on a display device of the wagering game machine, the wagering game including the game elements, wherein the game elements are colored according to the color scheme.

12. The method of claim 11 wherein the color information originates at a media controller configured to control the casino-wide light show.

13. The method of claim 11 further comprising:

receiving more color information indicating color settings for a casino-wide light show external to the wagering game machine;

selecting, based on the more color information, another color scheme for additional game elements of the wagering game, the selecting performed by the wagering game unit;

presenting the additional game elements during the wagering game, wherein the additional game elements are colored according to the other color scheme.

14. The method of claim 11, wherein the color information is received by the wagering game machine from an emotive lighting controller that connected to a DMX512 network.

15. The method of claim 11, wherein the color information is included in media information that indicates one or more of audio settings and video settings.

16. One or more non-transitory machine-readable storage devices including instructions which when executed by one or more processors cause the one or more processors to perform operations comprising:

receiving, in a wagering game machine, media information from a media network, wherein the media information includes lighting settings and audio settings for devices on the media network;

configuring colors for game elements of a wagering game based on the lighting settings;

configuring audio content of the wagering game based on the audio settings;

presenting the game elements of the wagering game on a video display device of the wagering game machine; and presenting the audio content of the wagering game on an audio presentation device of the wagering game machine.

17. The one or more non-transitory machine-readable storage devices of claim 16, wherein the media network conforms to the DMX512 protocol.

18. The one or more non-transitory machine-readable storage devices of claim 16, wherein the lighting settings indicate one or more colors.

19. The one or more non-transitory machine-readable storage devices of claim 16, wherein the audio settings indicate one or more of a volume setting, a treble setting, a base setting, a balance setting, and a fade setting.

20. The one or more non-transitory machine-readable storage devices of claim 16, wherein the media information includes commands for controlling a casino-wide media show presented by the devices on the media network.

* * * * *